May 14, 1968 G. A. CHAROT ET AL 3,383,652
INSTALLATIONS FOR CONTROLLING THE TRAJECTORY
WITH RESPECT TO THE GROUND OF VEHICLES
AND IN PARTICULAR AIRCRAFT
Filed April 19, 1965 7 Sheets-Sheet 1
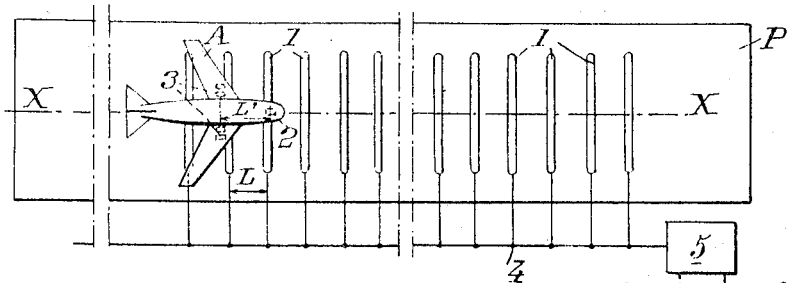
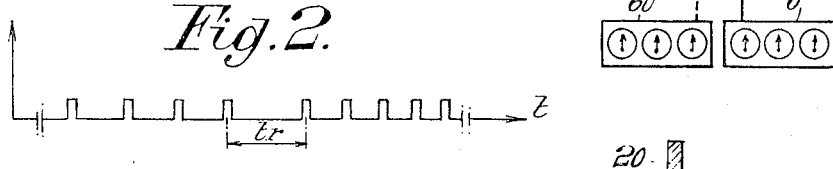
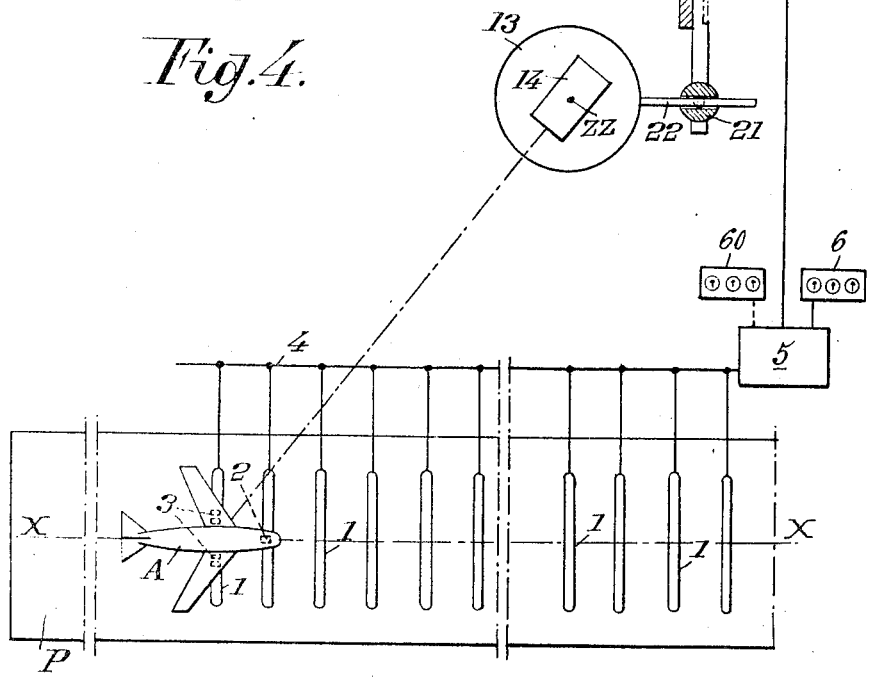

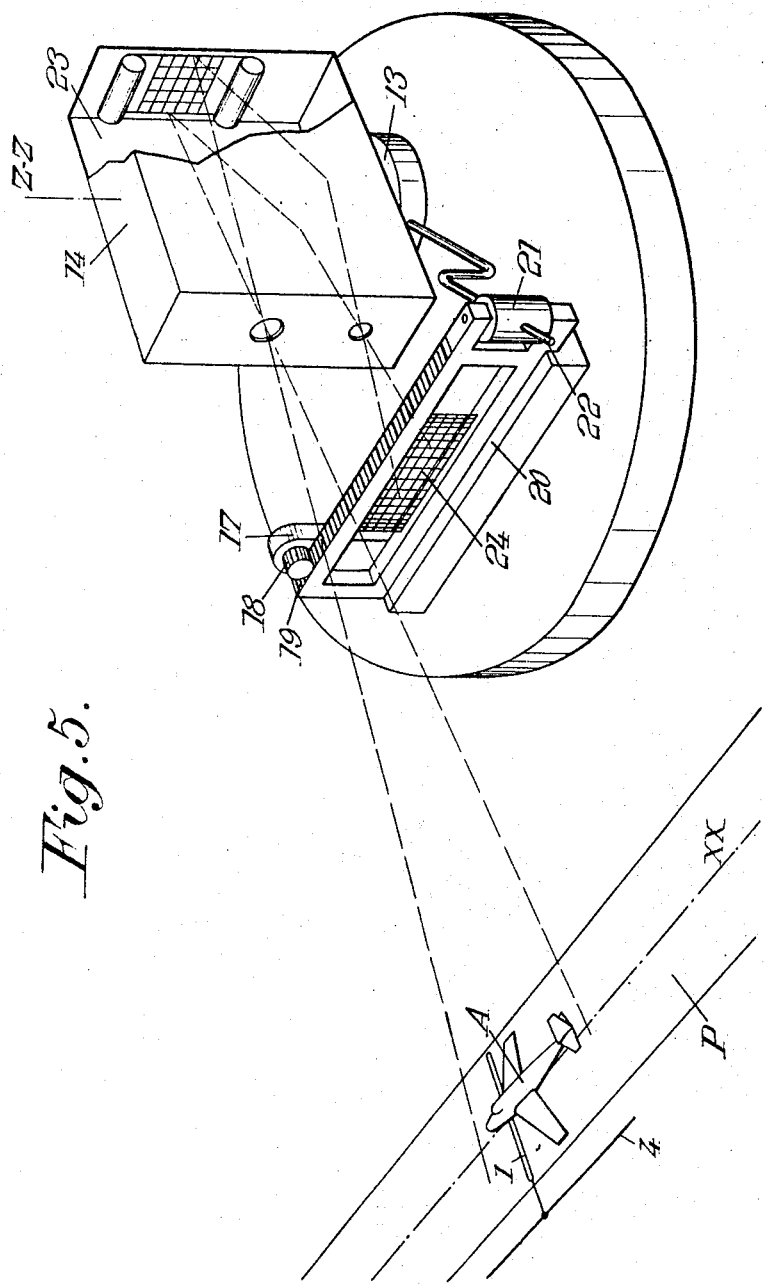

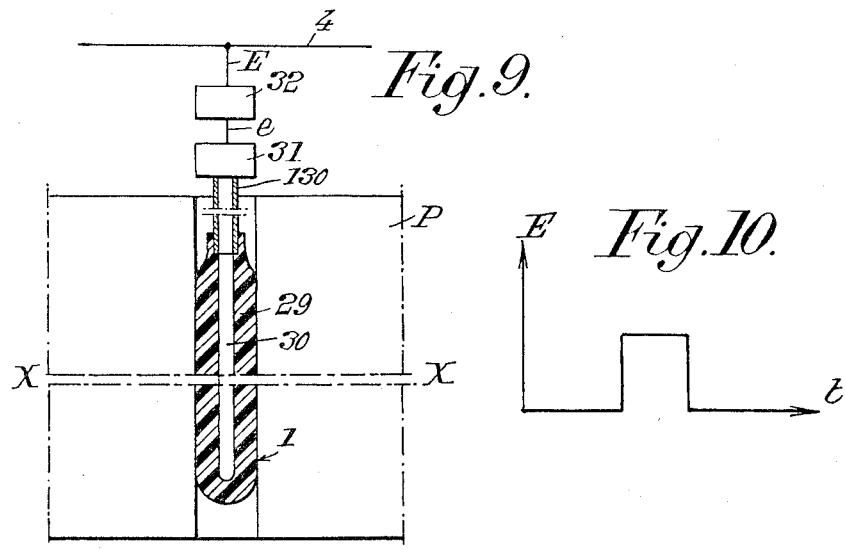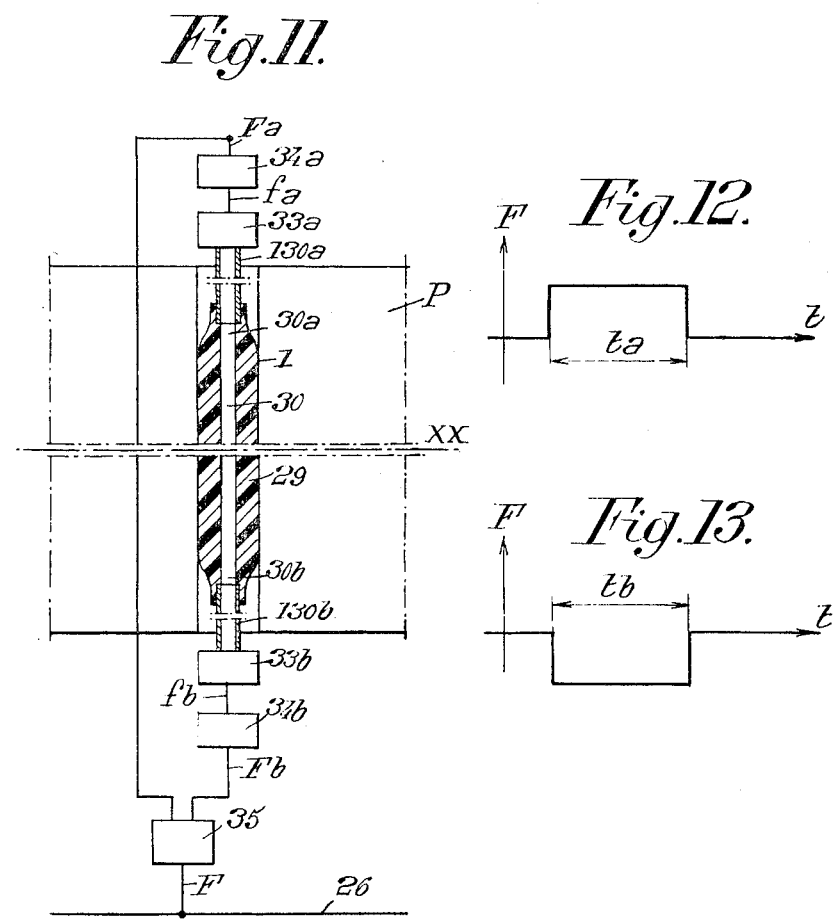

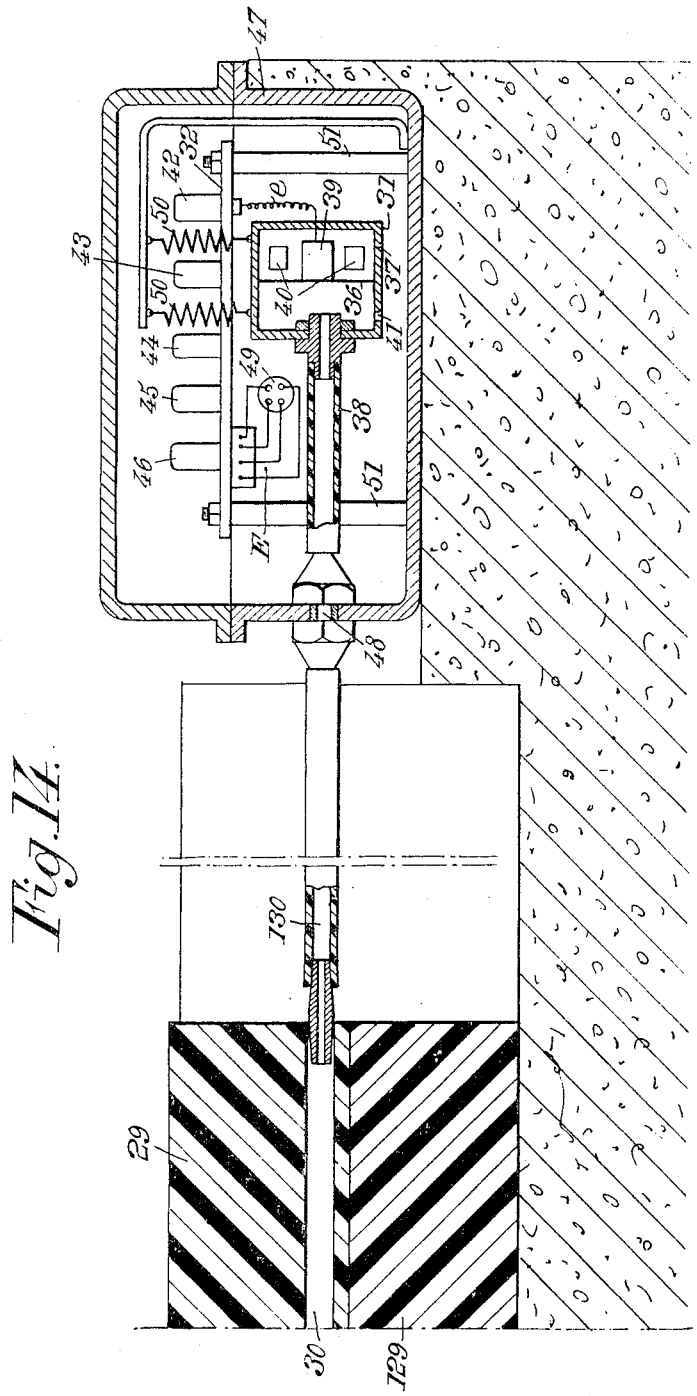

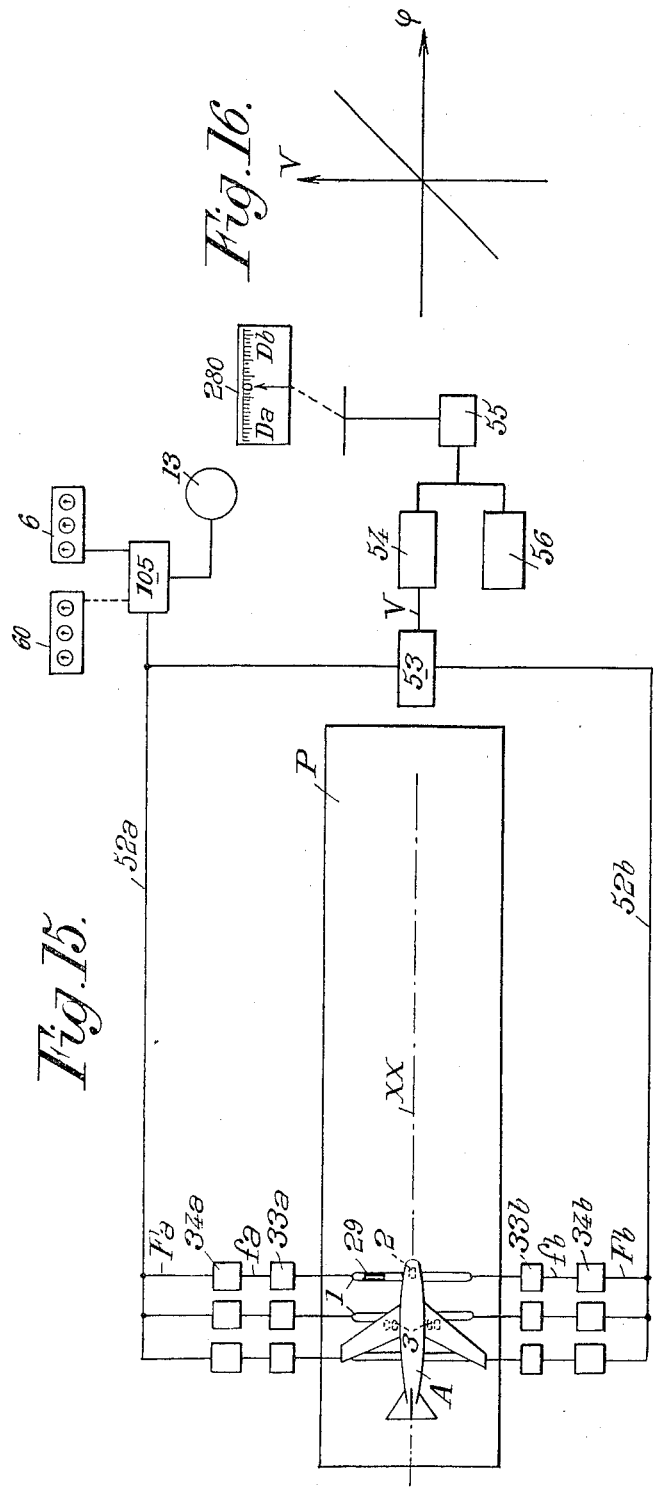

United States Patent Office 3,383,652
Patented May 14, 1968

3,383,652
INSTALLATIONS FOR CONTROLLING THE TRAJECTORY WITH RESPECT TO THE GROUND OF VEHICLES AND IN PARTICULAR AIRCRAFT
Georges Auguste Charot, Vitrolles, and Pierre Issartier and Robert Gaston Labouyrie, Marseille, Paul Antoine Revest, St-Victoret, and Jacques Valensi, Marseille, France, assignors to Centre National de la Recherche Scientifique, Paris, France
Filed Apr. 19, 1965, Ser. No. 449,131
Claims priority, application France, Apr. 24, 1964, 972,130; Mar. 2, 1965, 7,631
13 Claims. (Cl. 340—27)

ABSTRACT OF THE DISCLOSURE

Apparatus for determining the trajectory of aircraft with respect to the ground during takeoff and landing periods which involves the use of a track laid out along the runway and characterized by a multiplicity of crushable detection elements arranged transversely on the track at equally spaced intervals corresponding to the distance between the nose wheel of the airplane and its main landing gear. An electrical signalling circuit is provided which is actuated responsive to the crushing of the detection elements by a wheel of the aircraft. The signalling circuitry also includes an indicating arrangement to show the time and place where the nose wheel of the aircraft lifts off from the track during takeoff and comes into contact with the track during landing.

The present invention relates to installations for determining the trajectory, with respect to the ground, of vehicles, and in particular aircraft.

The invention is more especially intended for the equipment of airfields for use with commercial airplanes of different types.

An installation according to the present invention permits an accurate and rapid determination of the trajectory with respect to the ground of airplanes during the taking off and landing periods.

The main feature of the present invention consists in providing an installation of the above mentioned type with a multiplicity of detection elements disposed at known intervals from one another of an order of magnitude corresponding to the longitudinal dimension of said vehicles along the track upon which the vehicles are running, said detection elements extending in a direction perpendicular to that of the track, said detection elements being adapted to undergo, from a wheel belonging to a vehicle, a crushing which creates at least one electric signal, means being then provided for collecting the electric signals produced by the successive passages of said wheel on said multiplicity of detection elements, in such manner as to determine at least some characteristics of the trajectory of the vehicle.

When the installation according to the present invention is for the equipment of an airfield, the detection elements are disposed at regular intervals from one another.

In an installation according to the present invention, every detection element is arranged in such manner as to produce an electric signal called "passage signal" characterizing the time at which the aircraft passes on the detection element that is considered, the passage signal being collected and exploited on the ground and/or on board of the aircraft for determining in particular the distance over which the aircraft has been running, the speed of said aircraft and its acceleration.

In an installation according to the present invention, every detection element is, on the one hand, disposed in such manner as to extend on either side of a predetermined line, hereinafter called "assigned trajectory" and which is to be followed by the aircraft and, on the other hand, arranged in such manner as to produce at least one electric signal called "alignment signal" characterizing the actual trajectory of the vehicle with respect to said assigned trajectory, the alignment signals being collected and exploited on the ground and/or on board of the aircraft with a view to determining the actual trajectory of said aircraft with respect to the assigned trajectory.

Preferred embodiments of the present invention will be hereinafter described with reference to the appended drawings, given merely by way of example, and in which:

FIG. 1 is a diagrammatic plan view of an illustration for determining the trajectory of airplanes with respect to the ground, made according to a first feature of the invention;

FIGS. 2 and 3 are explanatory diagrams illustrating the conditions of operation of an installation according to FIG. 1;

FIG. 4 is a plan view of an installation according to a modification of that of FIG. 1;

FIG. 5 is a diagrammatic perspective view of an important element of the installation of FIG. 4;

FIG. 9 is a top plan view with parts in section of a detection element made according to a first embodiment;

FIG. 10 is a diagram illustrating the operation of the detecting element of FIG. 9;

FIG. 11 is a top plan view with parts in section of a detection element made according to another embodiment;

FIGS. 12 and 13 are two diagrams illustrating the operation of the detection element of FIG. 11;

FIG. 14 is a longitudinal section of the electric and electronic circuits of the detection element;

FIG. 15 is a diagrammatic plan view of an installation for the control of the trajectory of airplanes with respect to the ground according to still other features of the invention; and FIG. 16 is a diagram explaining the operation of the installation of FIG. 15.

Figure 6:
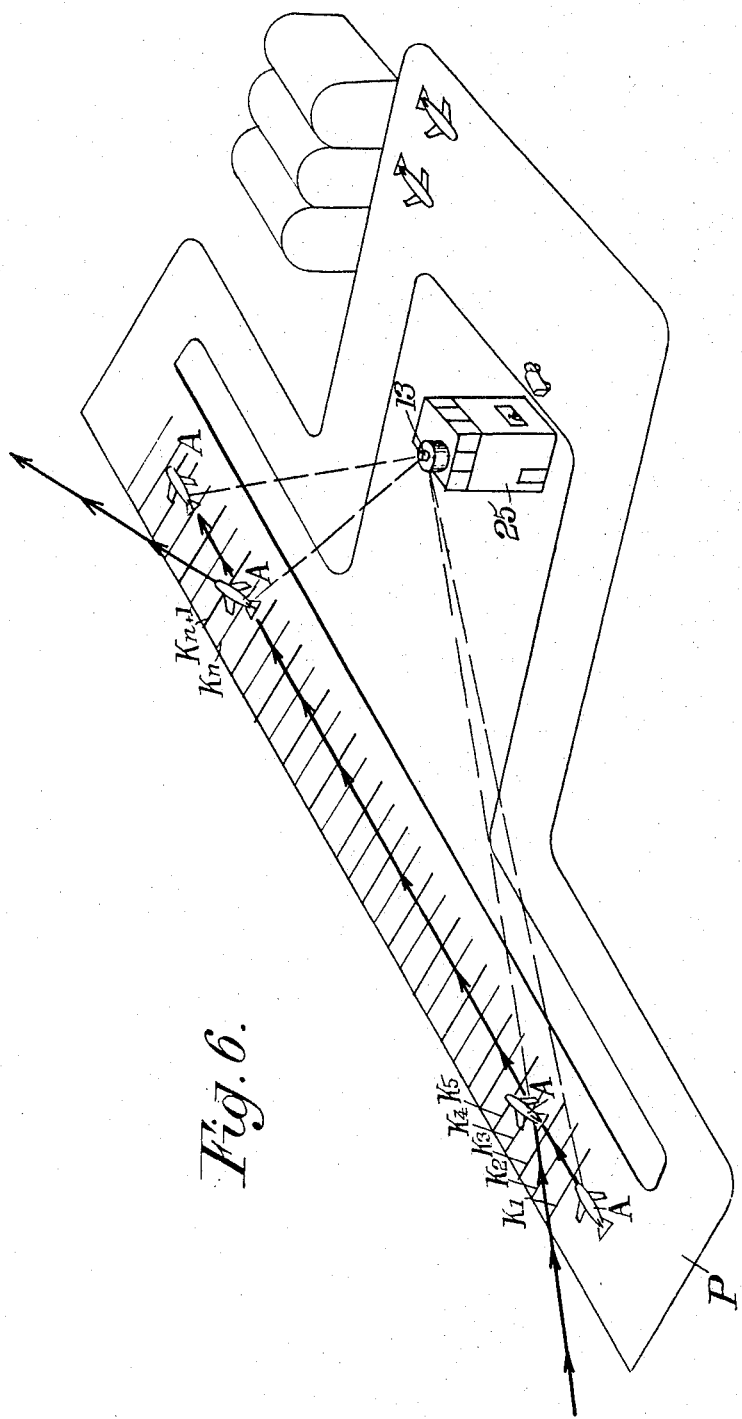
FIG. 6 is a general perspective view of an airfield fitted with an installation as illustrated by FIG. 4.

Detection elements 1 are disposed at equal intervals from one another along the track upon which the airplanes are running, said detection elements extending in a direction perpendicular to that of the track. The distance L between two consecutive detection elements 1 depends on the number of passage signals to be obtained during the taking off or landing periods of the airplane. This number of passage signals depends on the precision required for the determination of the airplane trajectory.

Every airplane A runs on the ground through its landing gear which comprises, in general, a nose wheel 2 and two sets of wheels 3 constituting the main landing gear. For one portion of the run (take off or landing) of airplane A, nose wheel 2 is not in contact with the running track.

The detection elements 1 undergo, from a wheel belonging to airplane A, a crushing which creates the passage signal. Said passage signal represents either the time when nose wheel 2 passes on the detection elements or the time when the two sets of wheels constituting the main landing gear pass on the detection elements.

In order to modify the succession of passage signals created by the successive passages of airplane A on detection element 1 when the nose wheel 2 of said airplane A leaves the ground or comes into contact therewith, it will be advantageous to give the distance L between two consecutive detection elements 1 a value of the same order or magnitude as the distance L' between the axis of nose wheel 2 and the axis of the two sets of wheels constituting the main landing gear.

Thus it is advantageous to give the distance L between two consecutive detection elements 1 a value lower than the distance L' between the axis of nose wheel 2 and the axis of the main landing gear.

Distance L' is for average commercial airplanes, about 12 to 19 m. (11.80 m. for Caravelle, 17.50 m. for D.C. 8 and 19 m. for Boeing 707).

By analysis of the frequency at which the consecutive passage signals are transmitted, it is possible to determine when and where nose wheel 2 leaves the ground or comes into contact therewith.

FIG. 2, where time $t$ is plotted in abscissas and a succession of passage signals in ordinates, shows that, for taking off, the time $tr$ between two consecutive passage signals becomes suddenly longer when nose wheel 2 leaves running track P, the place where nose wheel 2 left running track P being located between the two detection elements which created the above mentioned two passage signals.

FIG. 3, where the time $t$ is plotted in abscissas and a succession of passage signals in ordinates, shows that, for landing, the time $tr$ between two consecutive passage signals becomes suddenly shorter when nose wheel 2 comes into contact with track P, the place where nose wheel 2 came into contact with track P being located between the two detection elements which created the two last mentioned passage signals.

All the passage signals are collected by a collector cable 4 which transmits them to a computer 5.

Said computer 5 has to determine the sudden variation of frequency of the consecutive passage signals which arrive thereto and thereby to determine when and where nose wheel 2 of airplane A leaves track P or comes into contact therewith.

Said computer 5 has to sum up the passage signals in order to determine the distance covered by airplane A on track P from the transmission of the first signal passage by the first detection element reached by said airplane A.

Said computer 5 has also to compute, from the frequency at which the consecutive passage signals arrive to said computer, the instantaneous value of speed of airplane A as it is running on the ground from the first detection element reached by said airplane A and the variations of said instantaneous speed (positive or negative acceleration of airplane A).

Said computer has also to elaborate, for every passage signal received, an electric signal called "control signal."

Reading apparatus on the ground and on board of airplane A comprise dials and indicators which give different informations concerning:

the contact of nose wheel 2 of airplane A with track P;
the distance covered on the ground by airplane A;
the speed and acceleration (either positive or negative) of airplane A.

FIG. 1 shows also a reading apparatus on the ground directly connected to computer 5 and another reading apparatus 60 located on board of airplane A connected by radio with computer 5.

The control signal elaborated by computer 5 controls the pivoting, about a vertical axis ZZ, of a support 13 which carries a camera 14 in such manner that said camera 14 is directed toward the detection element 1 which has just created the detection signal.

FIG. 4 shows track P, detection elements 1, collector cable 4 and computer 5 which elaborate from each passage signal received the corresponding control signal. Each control signal is constituted by an electric impulse which acts directly on the armature of an electric motor 17 of the step by step type.

When airplane A crushes one of the detection elements 1, a passage signal is received by computer 5 which transmits an electric impulse constituting the corresponding control signal. Said electric impulse has for its effect to cause motor 17 to pass from its position before receiving said electric impulse to its position after receiving it, the angular differences between two consecutive positions being approximately equal to one another. The rotation of motor 17 controls, through appropriate mechanical means which will be described hereinafter, the pivoting of support 13. This pivoting is such that camera 14 carried by support 13 is directed toward the detection element which created the passage signal which, through computer 5 and motor 17, produced said pivoting.

It must be noted that the pivoting angle of support 13 about its vertical axis ZZ is not a linear function of the airplane motion.

Therefore, the rotation of motor 17 from one position to the next one must produce a pivoting of support 13 about its axis ZZ, the magnitude of said pivoting depending on the position along running track P of detection element 1 which created the passage signal that is considered.

The appropriate mechanical means which enable motor 17 to produce the pivoting of support 13 about its vertical axis ZZ comprise a pinion 18 fixed on the shaft of motor 17, said pinion being in mesh with a rack 19 displaceable by translation in a fixed guide 20. One extremity of said rack 19 cooperates through a slide 21 with a rod 22 rigid with support 13 and slidable in slide 21.

Camera 14, mounted on support 13, records simultaneously, as shown on FIG. 5:

the image of airplane A,
the image of a time indicating signal (not represented), and the image of a grid 24 moved in translation by rack 19 and having meshes of variable dimension, said grid being displaced in accordance with the displacements of camera 14.

FIG. 6 shows how this control installation works, the support 13 of camera 14 being mounted on the top of the control tower 25.

For the taking off period of airplane A, control means (not represented) supply motor 17 with current in such manner that camera 14 is directed toward the end of track P where airplane A is stopped in its take off starting point. As soon as airplane A crushes detection element $k_1$, motor 17 receives a first electric impulse which pivots support 13 so that camera 14 is directed toward detection element $k_1$.

As soon as airplane A crushes detection element $k_2$, motor 17 receives a second electric impulse which pivots support 13 so that camera 14 is directed toward detection element $k_2$ and so on.

When airplane A crushes detection element $k_n$ and the wheels of the main gear landing 3 leave the ground between detection element $k_n$ and detection element $k_{n+1}$, motor 17 receives a last electric impulse which pivots support 13 so that camera 14 is directed toward detection element $k_n$.

In this position, camera 14 can record airplane A trajectory during its flight as long as airplane A is in its field.

Then control means (not represented) bring back support 13 to its position for which camera 14 is directed toward the take off point.

For the landing period of airplane A, control means (not represented) supply motor 17 with current in such manner that camera 14 is directed toward the place of running track P where airplane A is supposed to come into contact with the ground, for example, between detection elements $k_4$ and $k_5$.

In this position, camera 14 may record airplane A trajectory as soon as it appears in its field and as soon as airplane A comes into contact with the ground and crushes detection element $k_5$, motor 17 receives a first electric impulse which pivots support 13 and causes camera 14 to be directed toward detection element $k_5$, said camera being, for instance, then started into operation.

As soon as airplane A crushes detection element $k_6$, motor 17 receives a second impulse which pivots support 13 about its axis ZZ and thus camera 14 is directed toward detection element $k_6$ and so on until airplane A stops on track P.

Control means (not represented) bring back support 13 to the position for which camera 14 is directed toward the place of track P where airplane A comes into contact with the ground between detection elements $k_4$ and $k_5$ as it has been above supposed.

Figure 7:
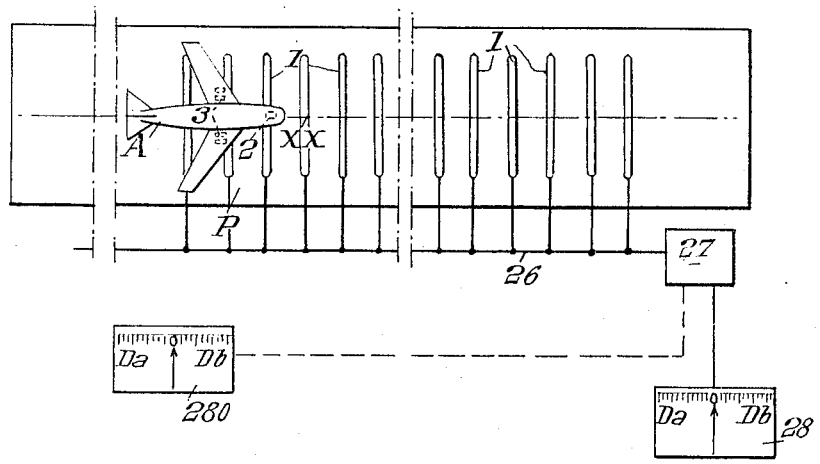
FIG. 7 is a diagrammatic plan view of an installation controlling the trajectory of air planes with respect to the ground, showing another feature of the present invention.

FIG. 7 shows how detection elements 1 are, on the one hand, disposed in such manner as to extend on either side of the axis XX of track P, said axis XX being the "assigned trajectory" which is to be followed by airplane A, and, on the other hand, arranged in such manner as to produce an electric alignment signal characterizing the actual trajectory of airplane A with respect to said assigned trajectory.

The alignment signals are collected by a collector cable 26 which transmits them to an analysis apparatus 27 which determines, from the alignment signals it receives, the actual trajectory of airplane A with respect to said axis XX of track P.

FIG. 7 shows also a reading apparatus 28 located on the ground and directly connected to said analysis apparatus 27 and another reading apparatus 280 located on board of airplane A and connected by radio with analysis apparatus 27.

The position of airplane A with respect to the axis XX of track P is reported on said two reading apparatus 28 and 280 which are graduated directly in length units.

Thus a difference $D_a$ in one direction or a difference $D_b$ in the other direction on said reading apparatus from a middle position corresponding to the assigned trajectory (axis XX of track P), determines the difference in one or the other direction of the actual trajectory of airplane A with respect to the axis XX of track P.

Figure 8:
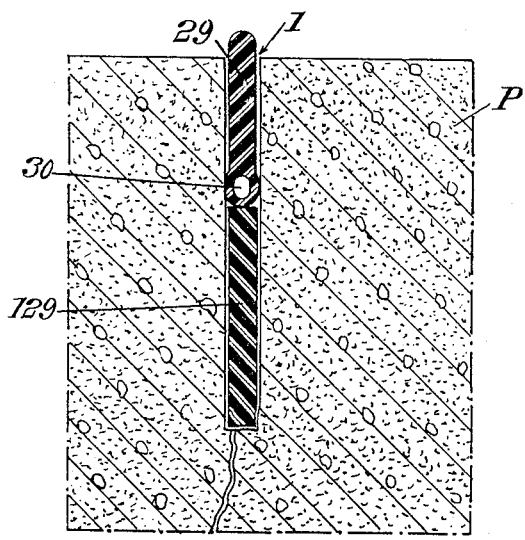
FIG. 8 is a cross-sectional view on an enlarged scale of a flexible strip forming a part of each of the detection elements of an installation according to the present invention.

FIG. 8 shows that each detection element 1 is constituted by a flexible strip 29 which extends in a direction perpendicular to that of track P. Said flexible strip 29 is provided on all its length with a channel 30 full of air at atmospheric pressure.

The pressure waves created by the crushing of said flexible strip 29 by the landing gear of airplane A are converted into electric signals.

Every flexible strip 29 is embedded in track P at the place of an expansion joint between elements constituting said track, said elements consisting, in general, of concrete units five meters wide.

Therefore distance L can be taken as equal to 10 meters (the distance between the nose wheel of an airplane to the main landing gear ranging from 12 to 19 meters).

FIG. 8 shows also that the cross section of flexible strip 29 has an elongated rectangular shape for the embedded portion, a bulging shape for the upper portion, the lower portion being provided with a channel 30. With such a shape, flexible strip 29 cannot be pulled out by the landing wheels of airplane A as it runs on track P.

A band of plastic material 129 is located under said flexible strip 29, said band 129 being inserted between two consecutive elements of track P with the interposition of a tight mastic.

Said flexible strip 29 is 35 mm. high and 5 mm. wide, its height above the level of track P being approximately 5 mm. The channel 30 located in the lower portion of said strip 29 is about 30 mm. under the level of track P. The cross section of channel 30 is approximately of elliptic shape with a vertical axis of about 4 mm. and a horizontal axis of about 3 mm.

Band 129 is about 5 mm. wide and 40 mm. high. For a track P 47 m. wide, flexible strip 29 extends on either side of the axis XX of track P and is 15 m. long; the band 129 extends along all the width of track P and therefore is 47 m. long.

The material constituting flexible strip 29 is chosen among synthetic materials which have good mechanical characteristics, physical characteristics permitting them to have approximately constant mechanical characteristics at different temperatures, and chemical characteristics permitting them to remain neutral with respect to kerosene (or another fuel) vapors or oil vapors.

Neoprene was advantageously used for constituting said flexible strip 29.

The material of band 129 must have the same characteristics as above mentioned for strip 29 but must be less plastic.

FIGS. 9 and 10 show an embodiment of detection elements 1 which create passage signals.

According to said embodiment, each detection element comprises, in order to convert the pressure waves created in channel 30 into electric passage signals, a pressure pick-up 31 connected, through an acoustic tube 130 in rilsan, with one end of channel 30, the other end of channel 30 being closed.

The pressure pick-up 31 delivers an electric signal $e$ when, at the time of its passage on track P, airplane A crushes the corresponding flexible strip 29. A signal shaping circuit 32 receives signal $e$ and delivers an electric signal E, the time constant of said signal shaping circuit being adjusted in such manner that, for a given time, the effects of all parasitic pressure waves coming from channel 30 are cancelled.

The parasitic pressure waves result from reflection on the closed end of channel 30 of waves produced at the passage of airplane A upon flexible strip 29.

FIG. 10 shows a diagram where the time $t$ is plotted in abscissas and the magnitude of the passage signal constituted by the electric signal E is plotted in ordinates, said passage signal being transmitted by collector cable 4 to computer 5.

FIGS. 11, 12 and 13 show another embodiment of detection element 1 in which each detection element comprises, in order to convert pressure waves created in channel 30 into electric alignment signals:

On the one hand, a first pressure pick-up 33a connected through an acoustic tube 130a in rilsan to the end 30a of channel 30, said pressure pick-up delivering an electric signal $f_a$, and, On the other hand, a second pressure pick-up 33b connected through an acoustic tube 130b in rilsan to the end 30b of conduit 30, said last mentioned pressure pick-up delivering an electric signal $f_b$.

FIG. 11 shows a signal shaping circuit 34a connected to pressure pick-up 33a. Said signal shaping circuit 34a receives the electric signal $f_a$ and delivers an electric signal $F_a$, the time constant of said signal shaping circuit 34a being adjusted in such manner that the effects of all parasitic pressure waves coming from channel 30 are cancelled.

FIG. 11 also shows a signal shaping circuit 34b connected to pressure pick-up 33b. Said signal shaping circuit 34b receives the electric signal $f_b$ and delivers an electric signal $F_b$, the time constant of said signal shaping circuit 34b being adjusted in such manner that the effects of all parasitic pressure waves coming from channel 30 are cancelled.

The two electric signals $F_a$ and $F_b$ delivered respectively by the two signal shaping circuits 34a and 34b are introduced into an electronic comparator 35 which elaborates an electric signal F constituting the alignment signal of detection element 1, said alignment signal being collected by collector cable 26.

Signal F characterizes the actual trajectory of airplane A with respect to the assigned trajectory, which is here the axis XX of track P.

When the actual trajectory of airplane A is the axis XX of track P, the pressure waves created by the passage, on flexible strip 29, of nose wheel 2, or of the two sets of wheels constituting the main landing gear of airplane A, reach the pressure pick-up 33a and 33b, respectively, at the same time. Therefore signals $f_a$ and $f_b$ are equal, signals $F_a$ and $F_b$ are in phase and comparator 35 delivers a zero signal.

But when the actual trajectory of airplane A is on one side marked a of track P, as shown on FIG. 12 where the time $t$ is plotted in abscissas and the magnitude of electric signal F is plotted in ordinates, one of said pressure waves reaches pressure pick-up 33a before that the other one reaches pressure pick-up 33b. Therefore, signals $f_a$ and $f_b$ are not equal, signals $F_a$ and $F_b$ are not in phase and comparator 35 delivers a positive signal F, for example, of a duration $t_a$ proportional to the difference $D_a$ between the actual trajectory of airplane A and the assigned trajectory XX.

In the same manner, when the actual trajectory of airplane A is on the side of track P marked b, as shown on FIG. 13 where the time $t$ is plotted in abscissas and the magnitude of the signal F is plotted in ordinates, one of said pressure waves reaches pressure pick-up 33b before that the other pressure wave reaches pressure pick-up 33a. Signals $f_a$ and $f_b$ are not equal, signals $F_a$ and $F_b$ are not in phase and comparator 35 delivers a negative signal F of a duration $t_b$ proportional to the difference $D_b$ between the actual trajectory of airplane A and the assigned trajectory.

Pressure pick-up 31 is of the electromagnetic type. It comprises, as shown on FIG. 14, for a detection element 1 which creates passage signals, a casing 37 divided in two substantially equal chambers by a diaphragm 36, one of said chambers being connected with a channel 30 through tubes 38 and acoustic tubes 130, and the other chamber of said casing 37 containing a coil 39 carried by diaphragm 36 and placed in the air gap of permanent magnet 40.

Every displacement of coil 39 produced by a pressure wave reaching diaphragm 36 creates in coil 39 an electric impulse constituting the electric signal $e$.

A hole 41 connects said casing 37 to the atmospheric pressure, thus avoiding a great increase of the pressure in the chamber connected to channel 30 which would decrease the time life of diaphragm 36.

The signal shaping circuit comprises:

A low pass filter 42 which eliminates the parasitic noises and in particular those produced by other airplanes which are flying near track P; said low pass filter 42 receives the electric signal $e$ delivered by electromagnetic pick-up 31;

An amplifier 43 and an electronic monostable trigger circuit 44 adjusted in such manner that, when it is excited by the signal $e$ amplified by amplifier 43, said monostable trigger circuit 44 delivers, for a given time, a rectangular signal;

A shunt cell 45 which delivers two impulses, one positive and one negative corresponding respectively to the beginning and the end of the rectangular signal delivered by monostable trigger circuit 44;

And a diode 46 which retains one of said two above mentioned impulses, for example the positive impulse, which constitutes the electric signal E.

Electromagnetic pick-up 31 and signal shaping circuit 32 are located in a fluidtight casing 47. Said casing 47 has an orifice 48 for the passage of tube 38 and its connection with acoustic tube 130, and two electric passages 49 (only one of them is represented on FIG. 14) permitting the electric feeding of pick-up 31, signal shaping circuit 32 and the passage of collector cable 4.

To avoid the transmission of mechanical vibrations to electromagnetic pick-up 31, casing 37 is flexibly mounted in casing 47 through two springs 50 made of an alloy of bronze and beryllium.

Signal shaping circuit 32 is fixed to casing 47 by supports 51.

FIG. 15 shows another embodiment of the invention consisting of detection elements which create both passage signals and alignment signals.

According to this embodiment of the invention, every detection element comprises, on the one hand, a flexible strip 29 embedded at the place where are the expansion joints of said track and, on the other hand, two pressure pick-ups 33a and 33b and two signal shaping circuits 34a and 34b respectively connected to said two pressure pick-ups 33a and 33b.

Two collector cables 52a and 52b collect respectively the electric signals $F_a$ and $F_b$ delivered by the signal shaping circuit 34a, 34b when an airplane passes on the detection element 1 that is considered.

The signal $F_a$ constitutes, in this particular embodiment, the passage signals and is introduced into computer 105; said computer 105 determines when and where the nose wheel 2 of airplane A leaves track P (taking off) or comes into contact therewith (landing).

Said computer 105 determines also the distance over which airplane A runs on track P.

Said computer 105 determines the speed and acceleration of airplane A and elaborates, for every passage signal it receives, the control signal which pivots support 13.

The electric signal $F_b$ is introduced, as shown on FIG. 15, into an analysis apparatus 53 which receives also the electric signal $Fa$. Said analysis apparatus 53 is arranged in such manner as to deliver a voltage V constituting the alignment signal.

In FIG. 16, where the phase difference $\varphi$ of signals $F_a$ and $F_b$ is plotted in abscissas and the voltage V in ordinates, when $F_a$ and $F_b$ are in phase (the actual trajectory of airplane A being the assigned trajectory) the error voltage V is zero.

For a positive phase difference corresponding for example to an airplane A trajectory located on the side of track P marked a, the error voltage $V_0$ is positive.

For a negative phase difference corresponding to airplane A trajectory being located on the side of track P marked b, the error voltage V is negative.

A high frequency transmitter 55 is connected to modulator 54 which receives voltage V and to another modulator 56. Modulator 54 has a frequency of 90 cycles per second while modulator 56 has a frequency of 150 cycles per second.

The high frequency transmitter is horizontally polarized and of the radio-range beacon type prescribed by the "International Landing System."

An indicator 280 receives by radio the alignment signal characterizing the actual trajectory of the airplane with respect to the assigned trajectory XX.

Indicator 280 and transmitter 55 are of the type prescribed by the "International Civil Aeronautical Organization."

This invention permits of determining the trajectory of an airplane with respect to the ground during the taking off and landing periods, with the following advantages:

The information concerning the trajectory of the airplane and in particular the difference between its actual trajectory and the assigned trajectory are given by indicators graduated directly in length units;

The information concerning the trajectory of the airplane from its take off point to its actual take off and/or from landing to stopping, permits a continual determination of the taking off and landing periods, An installation according to this invention works simply, which gives to its constituting elements a long life, The flexible strips of the detection elements may be set when the running track is built, while the other elements of the installation can be mounted later on.

In a general manner, while the above description discloses what are deemed to be practical embodiments of the invention, said invention is not limited thereto as there might be changes made in the arrangement, disposition and form of the parts without departing from the principle of the invention as comprehended within the scope of the appended claims.

What we claim is:

1. For use in relation with a track along which airplanes are to travel, said airplanes including each a wheeled main landing gear and a front wheel ahead of said landing gear, an installation for determining the trajectory of said airplanes which comprises in combination,
    a multiplicity of crushable detection elements carried by the track, extending transversely to the direction thereof, each at the same interval from the preceding one, said interval being of the same order of magnitude as the longitudinal distance between the front wheel and the main landing gear of said airplanes,
    means for producing electric signals, called passage signals, in response to the crushing of said detection elements by a wheel,
    a support rotatable about a vertical axis fixed with respect to the ground,
    a moving picture camera secured to said support,
    electrical means carried by the ground, for rotating said support about said vertical axis, and
    means responsive to said passage signals for producing control signals to operate said electrical means to cause said camera to be directed toward the airplane that has produced said passage signals.

2. For use in relation with a track along which airplanes are to travel, said airplanes including each a wheeled main landing gear and a front wheel ahead of said landing gear, an installation for determining the trajectory of said airplanes which comprises in combination,
    a multiplicity of crushable detection elements carried by the track, extending transversely to the direction thereof, each at the same interval from the preceding one, said interval being of the same order of magnitude as the longitudinal distance between the front wheel and the main landing gear of said airplanes,
    means on the ground for producing electric signals, called passage signals, in response to the crushing of said detection elements by a wheel,
    a collecting cable connected to all of said signal producing means, and
    a computer apparatus having its input connected to said collecting cable and capable of performing the three following functions:
        to detect any sudden change of the frequency of the passage signals so as to indicate the lifting of said front wheel from the track when an airplane on the track is taking off and the coming of said front wheel into contact with the track when an airplane is landing on the track,
        to sum up the number of passage signals so as to determine the length of the run of said airplane on the track, and
        to determine the speed of said airplane running on the track and its acceleration.

3. An installation according to claim 2 further comprising an apparatus on the ground for reading the indications concerning the front wheel of the aircraft, the distance over which said aircraft has run on the track and the speed and acceleration on the aircraft, said reading apparatus being electrically connected with said computer apparatus.

4. An installation according to claim 2 further including a reading apparatus mounted on an aircraft for reading the indications concerning the front wheel of the aircraft, the distance over which said aircraft has run on the track and the speed and acceleration on the aircraft, said reading apparatus being electrically controlled by said computer apparatus.

5. For use in relation with a track along which airplanes are to travel, said airplanes including each a wheeled main landing gear and a front wheel ahead of said landing gear, an installation for determining the trajectory of said vehicles which comprises in combination,
    a multiplicity of crushable detection elements carried by the track, extending transversely to the direction thereof, each at the same interval from the preceding one, said interval being of the same order of magnitude as the longitudinal distance between the front wheel and the main landing gear of said airplanes,
    means for producing electric signals, called passage signals, in response to the crushing of said detection elements by a wheel,
    a support rotatable about a vertical axis fixed with respect to the ground,
    a step by step, electric motor for rotating said support,
    a moving picture camera secured to said support,
    a cable running along the track and connected with said detection elements for collecting the passage signals produced by said detection elements,
    a computer apparatus having its input connected with said cable and its output connected with said step by step motor to transform said passage signals into control signals each adapted to cause said motor to move one step.

6. An installation according to claim 5 including mechanical means between said motor and said rotatable support for causing the angle of pivoting of said support about its vertical axis to be a trigonometric function of the movement of the airplane along the track.

7. An installation according to claim 5 including:
    a pinion operatively driven by said step by step motor,
    a rack in mesh with said pinion,
    a fixed slideway for guiding said rack,
    a member pivotally carried by said rack,
    and a rod fixed on said support and slidable in said member.

8. An installation according to claim 6 further including, in front of said camera, a grid slidable on the ground, and operatively connected with said mechanical means, the vertical lines of said grid having the intervals between them variable in accordance with the perspective effect with which the airplane is visible from the camera.

9. For use in relation with a track along which wheeled airplanes are to travel, an installation for determining the trajectory of said airplanes along said track which comprises, in combination,
    a multiplicity of crushable rectilinear detection elements carried by the track, extending transversely to the direction thereof and located at equal intervals from one another, each of said detection elements comprising a flexible band provided with a channel therein, said channel being filled with a gaseous fluid, and
    means for transforming into an electric signal every pressure wave produced in said channel when said flexible band is crushed by an airplane wheel, said last mentioned means including a first pressure pick-up, a first acoustic tube connecting one of the ends of said channel with said pressure pick-up, an electronic circuit to transform the pressure waves into electric signals, a second pressure pick-up, an acoustic tube connecting the other end of said channel with said second pressure pick-up, an electronic circuit to transform the pressure waves in said second pressure pick-up into electric signals the time constants of said two electronic circuits being adjusted to reduce to zero for a given time the effect of a parasitic pressure wave from said channel and an electronic comparator receiving at its inputs the signals delivered by said electronic circuits respectively and producing at its output an electric signal.

10. An installation according to claim 9 wherein said pressure pick-ups are of the electro-magnetic type.

11. For use in relation with a track along which airplanes are to travel, said airplanes including each a wheeled landing gear, an installation for determining the trajectory of said airplanes which comprises in combination, a plurality of crushable detection elements carried by the track extending transversely to the direction thereof each at the same interval from the preceding one, each of said detection elements comprising a flexible band provided with a channel therein and engaged in the track, two pressure pick-ups connected with the ends of said channel, respectively, and two electronic circuits to transform the pressure waves in said pick-ups into electric signals, two cables for collecting the two sets of electric signals delivered by the plurality of said electronic circuits when an airplane is running on said detection elements, a calculator apparatus connected to one of said cables, an analysis apparatus connected to said two collecting cables to deliver an error voltage which is a linear function of the electronic signals it receives, and a high frequency transmitter including modulators one of which receives said error voltage.

12. For use in relation with a track along which airplanes are to travel, said airplanes including each a wheeled main landing gear and a front wheel ahead of said landing gear, an installation for determining the trajectory of said airplanes which comprises in combination, a multiplicity of crushable detection elements carried by the track, extending transversely to the direction thereof, each at the same interval from the preceding one, said interval being of the same order of magnitude as the longitudinal distance between the front wheel and the main landing gear of said airplanes, means for producing electric signals in response to the crushing of said detection elements by a wheel, and means for indicating the time and the place where said front wheel has lifted from the track when an airplane on the track is taking off and said front wheel has come into contact with the track when an airplane is landing on the track.

13. For use in relation with a track along which airplanes are to travel, said airplanes including each a wheeled main landing gear and a front wheel ahead of said landing gear, an installation for determining the trajectory of said airplanes which comprises in combination, a multiplicity of crushable detection elements carried by the track, extending transversely to the direction thereof, each at the same interval from the preceding one, said interval being of the same order of magnitude as the longitudinal distance between the front wheel and the main landing gear of said airplanes, means for producing electric signals in response to the crushing of said detection elements by a wheel, and means for determining the value and variation of the speed of an airplane as it is running on said track.

References Cited
UNITED STATES PATENTS

| | | | |
|---|---|---|---|
| 1,598,804 | 9/1926 | Brumback | 340—31 |
| 2,213,409 | 9/1940 | Quilliam | 340—38 |
| 3,020,005 | 2/1962 | Stockwell | 340—31 |

JOHN W. CALDWELL, *Primary Examiner.*

A. H. WARING, *Assistant Examiner.*